United States Patent
Kitahara

(10) Patent No.: US 12,126,236 B2
(45) Date of Patent: Oct. 22, 2024

(54) ACTUATOR WITH FIRST CONNECTING BODY DISPOSED IN FIRST DIRECTION AND SECOND CONNECTING BODY DISPOSED IN SECOND DIRECTION

(71) Applicant: NIDEC SANKYO CORPORATION, Nagano (JP)

(72) Inventor: Hiroshi Kitahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 276 days.

(21) Appl. No.: 17/727,814

(22) Filed: Apr. 25, 2022

(65) Prior Publication Data

US 2022/0352801 A1    Nov. 3, 2022

(30) Foreign Application Priority Data

Apr. 28, 2021    (JP) .................................. 2021-076064

(51) Int. Cl.
*H02K 33/02*    (2006.01)

(52) U.S. Cl.
CPC .................................. *H02K 33/02* (2013.01)

(58) Field of Classification Search
CPC .. H02K 7/1869; H02K 7/1876; H02K 7/1892; H02K 33/00; H02K 33/02; H02K 33/16; H02K 35/02; G06F 3/016; G06F 3/03545; B06B 1/045
USPC ........ 310/25, 15, 12.01, 81, 80, 321, 20, 21, 310/28–30, 36–37, 40 MM
See application file for complete search history.

(56) References Cited

U.S. PATENT DOCUMENTS

| | | | | |
|---|---|---|---|---|
| 9,774,236 B2 * | 9/2017 | Xu | ......................... | H02K 33/04 |
| 9,948,170 B2 * | 4/2018 | Jun | ........................ | H02K 33/00 |
| 10,003,746 B2 * | 6/2018 | Minamisawa | ........... | G03B 5/00 |
| 10,447,130 B2 * | 10/2019 | Mao | ........................ | B06B 1/045 |
| 10,447,131 B2 * | 10/2019 | Mao | ........................ | H02K 33/16 |
| 10,447,134 B2 * | 10/2019 | Mao | ........................ | H02K 33/02 |
| 10,596,594 B2 * | 3/2020 | Ling | ..................... | H02K 33/02 |
| 10,674,278 B2 * | 6/2020 | Zhou | ..................... | H04R 9/025 |
| 10,797,576 B2 * | 10/2020 | Wu | ........................ | H02K 33/18 |
| 10,951,104 B2 * | 3/2021 | Takeda | ................ | H02K 41/031 |
| 11,050,334 B2 * | 6/2021 | Mori | ..................... | H02K 33/18 |
| 11,271,465 B2 * | 3/2022 | Kitahara | ................ | H02K 33/16 |
| 11,870,317 B2 * | 1/2024 | Mao | ........................ | H02K 33/18 |

(Continued)

FOREIGN PATENT DOCUMENTS

| | | | | |
|---|---|---|---|---|
| JP | 2020102901 | | 7/2020 | |
| WO | WO-2019003873 A1 * | 1/2019 | ............. | H02K 33/06 |

*Primary Examiner* — Maged M Almawri
(74) *Attorney, Agent, or Firm* — JCIPRNET

(57) ABSTRACT

The actuator includes a movable body, a support body with a case that accommodates the movable body and a coil holder, a connecting body connected to the movable body and the support body, and a magnetic drive circuit including a coil and magnets opposed to the coil in a Z direction and causing the movable body to vibrate in an X direction with respect to the support body. The connecting body 4 includes the first connecting body 6 disposed at the position where the movable body 5 and the support body 3 are opposed to each other in the Z direction (first direction), and the second connecting body 9 disposed at the position where the movable body 5 and the support body 3 are opposed to each other in the X direction (second direction). The first connecting body and the second connecting body are viscoelastic bodies.

6 Claims, 6 Drawing Sheets

(56) References Cited

U.S. PATENT DOCUMENTS

| | | | | |
|---|---|---|---|---|
| 11,909,289 | B2* | 2/2024 | Ma | H02K 33/02 |
| 2009/0267423 | A1* | 10/2009 | Kajiwara | H02K 33/02 |
| | | | | 310/38 |
| 2013/0313919 | A1* | 11/2013 | Nakamura | H02K 33/16 |
| | | | | 310/25 |
| 2016/0372998 | A1* | 12/2016 | Xu | H02K 33/16 |
| 2017/0033627 | A1* | 2/2017 | Xu | H02K 1/34 |
| 2017/0144191 | A1* | 5/2017 | Mao | B06B 1/045 |
| 2017/0310203 | A1* | 10/2017 | Takeda | H02K 33/16 |
| 2017/0373578 | A1* | 12/2017 | Wu | H02K 33/16 |
| 2018/0059794 | A1* | 3/2018 | Nakamura | H02K 33/02 |
| 2018/0297061 | A1* | 10/2018 | Mao | H02K 5/04 |
| 2018/0297070 | A1* | 10/2018 | Xu | B06B 1/045 |
| 2018/0297071 | A1* | 10/2018 | Xu | B06B 1/045 |
| 2018/0297077 | A1* | 10/2018 | Chai | B06B 1/045 |
| 2018/0351442 | A1* | 12/2018 | Liu | H02K 33/16 |
| 2019/0081544 | A1* | 3/2019 | Zhu | H02K 33/02 |
| 2019/0305658 | A1* | 10/2019 | Mori | H02K 33/12 |
| 2019/0305660 | A1* | 10/2019 | Tsuchihashi | H02K 33/16 |
| 2019/0315070 | A1* | 10/2019 | Yanagisawa | H02K 33/16 |
| 2020/0044526 | A1* | 2/2020 | Tang | H02K 33/18 |
| 2020/0044541 | A1* | 2/2020 | Takeda | H02K 33/16 |
| 2020/0059147 | A1* | 2/2020 | Kitahara | H02K 33/16 |
| 2020/0107134 | A1* | 4/2020 | Mori | H04R 7/18 |
| 2020/0161955 | A1* | 5/2020 | Kitahara | H02K 33/16 |
| 2021/0075306 | A1* | 3/2021 | Little | H02K 33/02 |
| 2021/0359583 | A1* | 11/2021 | Toyota | H02K 33/16 |
| 2022/0200428 | A1* | 6/2022 | Shao | H02K 33/02 |
| 2022/0200433 | A1* | 6/2022 | Mao | H02K 33/18 |
| 2022/0209634 | A1* | 6/2022 | Ma | H02K 33/02 |
| 2022/0368206 | A1* | 11/2022 | Ma | H02K 33/02 |

* cited by examiner

ACTUATOR WITH FIRST CONNECTING BODY DISPOSED IN FIRST DIRECTION AND SECOND CONNECTING BODY DISPOSED IN SECOND DIRECTION

CROSS REFERENCE TO RELATED APPLICATION

The present invention claims priority under 35 U.S.C. § 119 to Japanese Application No. 2021-076064 filed Apr. 28, 2021, the entire content of which is incorporated herein by reference.

BACKGROUND

Field of the Invention

At least an embodiment of the present invention relates to an actuator which vibrates a movable body.

Description of the Related Documents

Japanese Patent Laid-Open No. 2020-102901 discloses an actuator that has a movable body including one of magnets and coils and a support body including the other of the magnets and the coils, and that vibrates the movable body with respect to the support body by applying a drive current to the coil. This type of actuator uses an elastic or viscoelastic body as a connecting body which connects the support body and the movable body. When the movable body is vibrated, a reaction force corresponding to the vibration of the movable body is applied to the support body through the connecting body. As a result, a user who touches the support body can feel the vibration.

In actuators that vibrate a movable body, a user can experience a large force (sense of force) by increasing acceleration of the movable body. However, if a drive waveform and a drive voltage of the magnetic drive circuit are controlled to increase the acceleration, the movable body will move largely and collide with the fixed body. Therefore, it is difficult for a small-sized actuator, which cannot secure a wide movable range of the movable body, to move the movable body with large acceleration and to allow the user to experience the sense of force.

At least an embodiment of the present invention provides an actuator that can vibrate the movable body while moving it at large acceleration even if the movable range is small.

SUMMARY

The actuator of at least an embodiment of the present invention includes a support body, a movable body, a connecting body that is connected to the movable body and the support body, and a magnetic drive circuit including a coil and a magnet that is opposed to the coil in a first direction and causing the movable body to vibrate in a second direction that intersects the first direction with respect to the support body, in which the connecting body includes a first connecting body disposed at a position where the movable body and the support body are opposed in the first direction or a position where the movable body and the support body are opposed in a third direction that intersects the first direction and intersects the second direction and a second connecting body disposed at a position where the movable body and the support body are opposed in the second direction.

According to at least an embodiment of the present invention, the first connecting body is disposed at a position where the movable body and the support body are opposed to each other in a direction that intersects a vibration direction of the movable body (the first direction or the third direction), and the second connecting body is disposed at a position where the movable body and the support body are opposed to each other in the vibration direction of the movable body (the second direction). In this way, when the movable body vibrates, the first connecting body is sheared/deformed while the second connecting body is expanded/contracted and deformed, and a movable range of the movable body is regulated by the second connecting body. Therefore, since not only deformation characteristics of the first connecting body but also the deformation characteristics of the second connecting body can be used, the drive force applied to the movable body can be increased even when the movable body has a narrow movable range, and the movable body can be vibrated while being moved with large acceleration. Therefore, even with the small-sized actuator, the user can experience the sense of force caused by movement of the movable body with large acceleration.

In at least an embodiment of the present invention, the first connecting body and the second connecting body are viscoelastic bodies. If a viscoelastic body is used, the first connecting body is deformed with a deformation characteristic that has many linear components when it is sheared/deformed, while the second connecting body is deformed with a deformation characteristic that has many nonlinear components when it is compressed/deformed, and a spring constant of the second connecting body increases as a compression amount increases. By using the deformation characteristics of the viscoelastic body as above, the drive force applied to the movable body can be increased even when the movable range of the movable body is narrow, and the movable body can be vibrated while being moved with large acceleration.

In at least an embodiment of the present invention, such a structure can be employed that the spring constant when the first connecting body is deformed in a compression direction is different from the spring constant when the second connecting body is deformed in the compression direction. For example, the spring constant when the second connecting body is deformed in the compression direction is larger than the spring constant when the first connecting body is deformed in the compression direction. As described above, by increasing the spring constant of the second connecting body that is disposed at a position of compression/deformation by the movable body, the amount of compression deformation of the second connecting body can be suppressed even when the movable body is moved with greater acceleration. Therefore, even when the movable range of the movable body is narrow, the movable body can be moved with larger acceleration, and the user can experience a greater sense of force.

In at least an embodiment of the present invention, the drive waveform when the magnetic drive circuit is driven has a square wave. In this way, since a large drive force can be applied to the movable body instantaneously, the acceleration of the movable body can be increased rapidly. Therefore, even when the movable range of the movable body is narrow, the movable body can be moved with large acceleration. Therefore, the user can experience a great sense of force.

In at least an embodiment of the present invention, the support body includes a case that accommodates the movable body and the magnetic drive circuit, and a coil holder that holds the coil, the coil holder includes a plate portion in which a coil placement hole is provided, the movable body includes a yoke that holds the magnet, the yoke includes a first flat plate portion opposed to the plate portion from one side of the first direction, a second flat plate portion opposed to the plate portion from the other side of the first direction, and a pair of connecting plate portions disposed on both sides in the second direction of the plate portion, the case includes a pair of side plate portions disposed on both sides in the second direction of the yoke, and the second connecting body is disposed between one of the pair of connecting plate portions and one of the pair of side plate portions, and between the other of the pair of connecting plate portions and the other of the pair of side plate portions. In this way, in whichever direction of one side and the other side of the second direction the movable body moves, the second connecting body is compressed/deformed. Therefore, the movable body can be driven with large acceleration by using the increase of the spring constant when the second connecting body is compressed/deformed.

In at least an embodiment of the present invention, the support body has a first plate that covers the plate portion and the coil from one side of the first direction, and a second plate that covers the plate portion and the coil from the other side of the first direction, the magnet includes a first magnet that is fixed to the first flat plate portion and is opposed to the coil from one side of the first direction through the first plate, and a second magnet that is fixed to the second flat plate portion and is opposed to the coil from the other side of the first direction through the second plate, and the first connecting body includes a one-side connecting body that connects the first flat plate portion and the first plate, and an other-side connecting body that connects the second flat plate portion and the second plate. In this way, if a gap in the first direction between the yoke and the coil holder is used as a placement space for the connecting body, there is no need to secure the placement space for the connecting body between the case and the yoke. Therefore, a dimension (height) of the actuator in the first direction can be reduced to make it more compact.

According to at least an embodiment of the present invention, the first connecting body is disposed at a position where the movable body and the support body are opposed to each other in a direction that intersects a vibration direction of the movable body (the first direction or the third direction), and the second connecting body is disposed at a position where the movable body and the support body are opposed to each other in the vibration direction of the movable body (the second direction). In this way, when the movable body vibrates, the first connecting body is sheared/deformed while the second connecting body is expanded/contracted and deformed, and a movable range of the movable body is regulated by the second connecting body. Therefore, since not only deformation characteristics of the first connecting body but also the deformation characteristics of the second connecting body can be used, the drive force applied to the movable body can be increased even when the movable body has a narrow movable range, and the movable body can be vibrated while being moved with large acceleration. Therefore, even with the small-sized actuator, the user can experience the sense of force caused by movement of the movable body with large acceleration.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

An embodiment of an actuator to which at least an embodiment of the present invention is applied will be described below with reference to the drawings.

Overall Configuration

Figure 1:
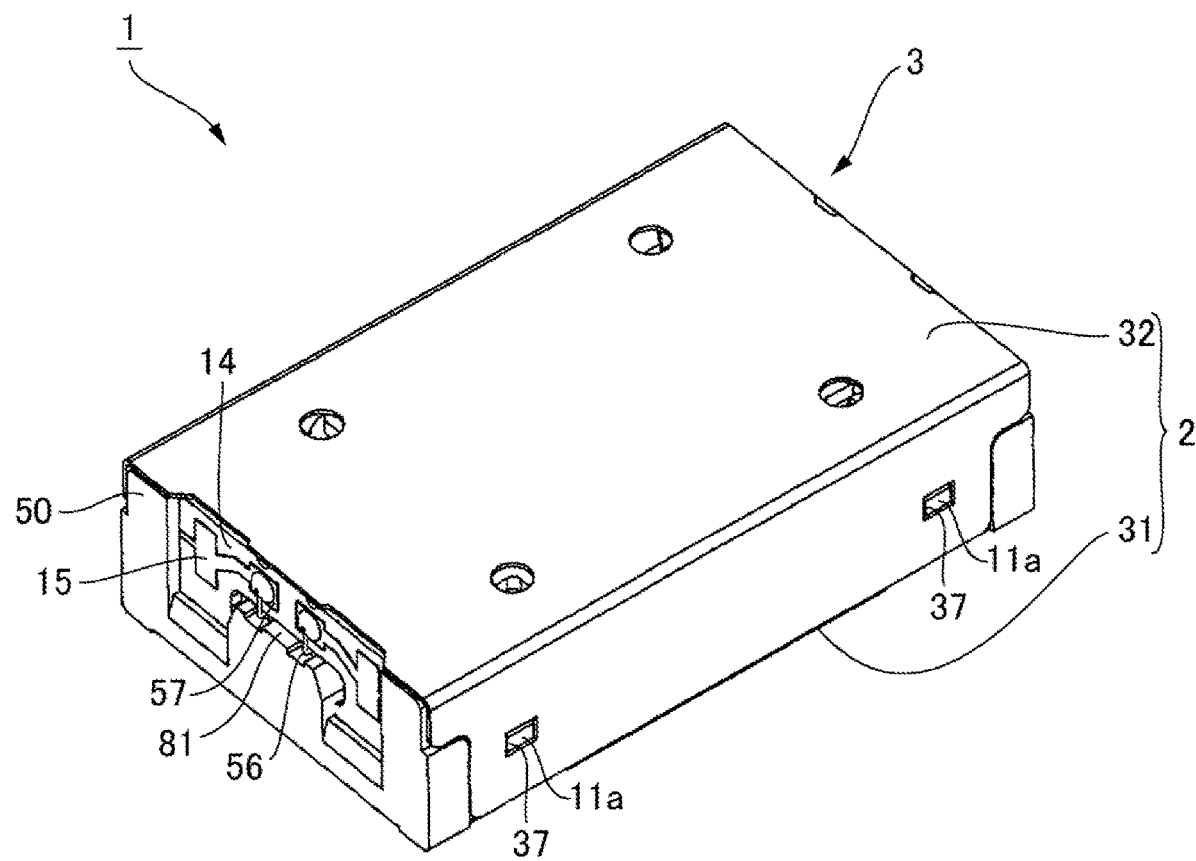
FIG. 1 is a perspective view of an actuator to which at least an embodiment of the present invention is applied.
Figure 1:
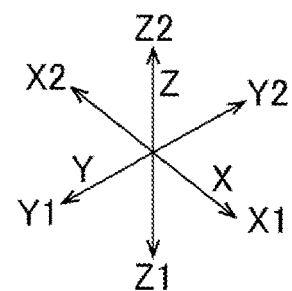
Figure 2:
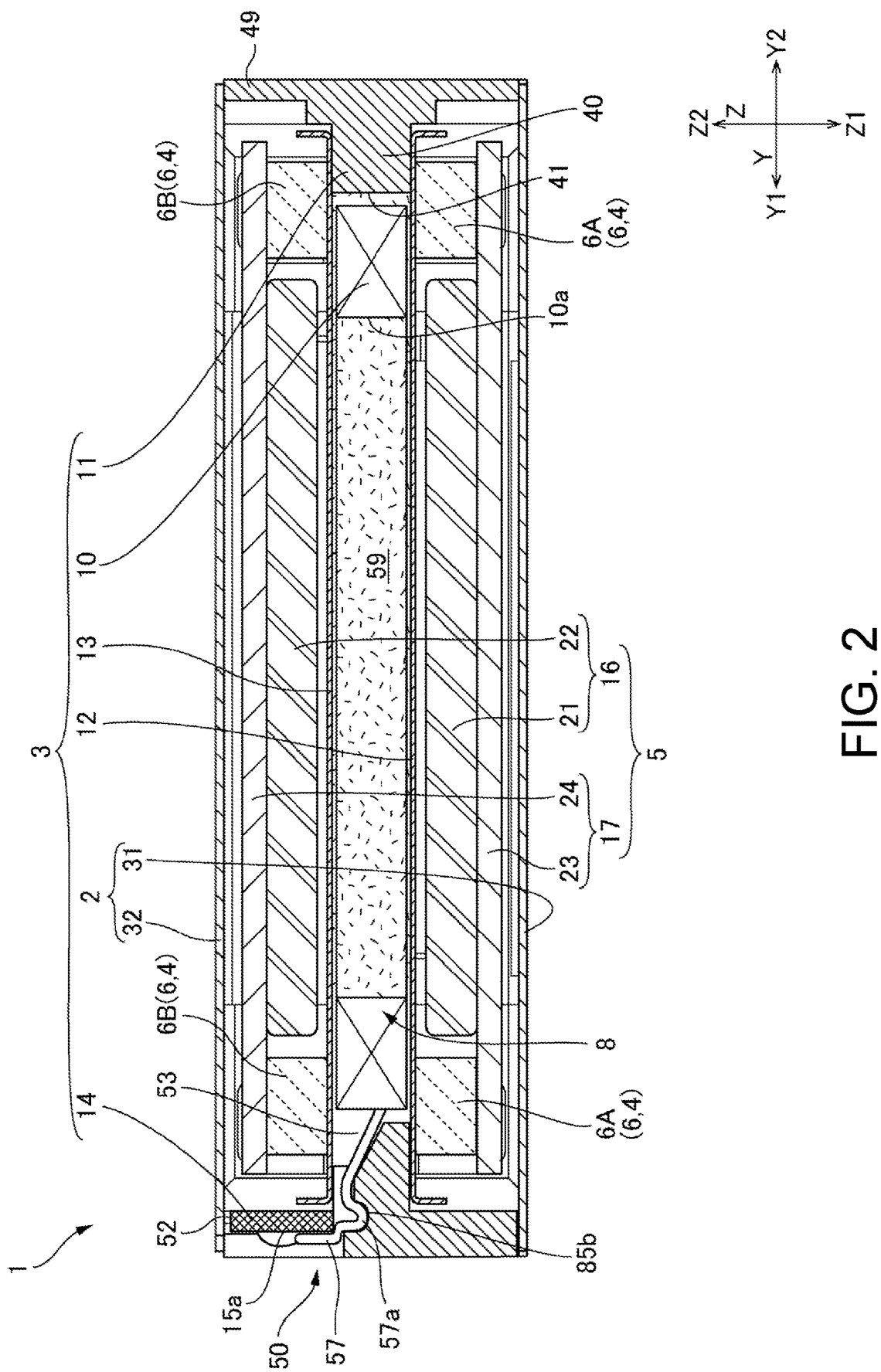
FIG. 2 is a cross-sectional view of the actuator when cut in a longitudinal direction.
Figure 3:
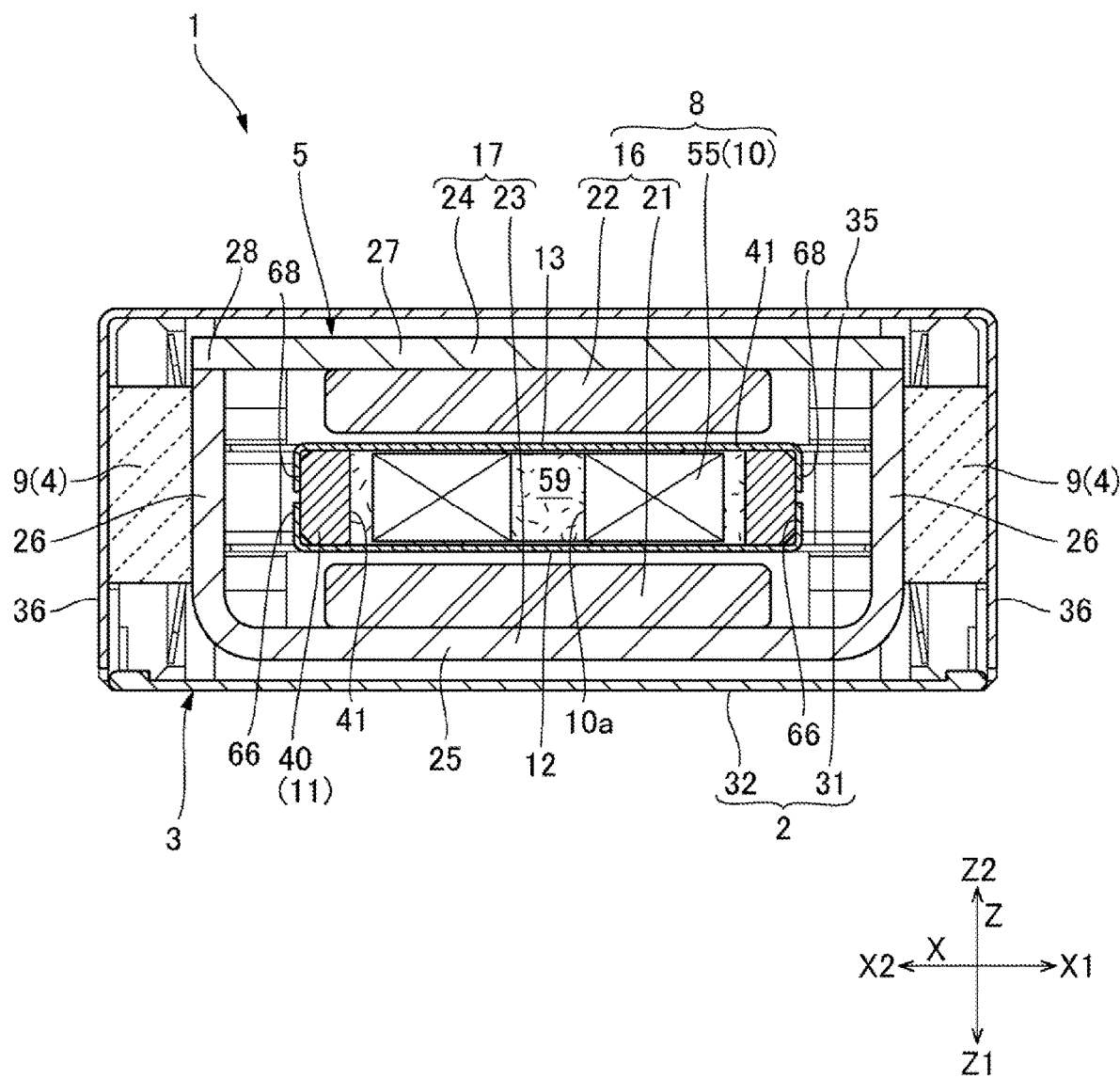
FIG. 3 is a cross-sectional view of the actuator when cut in a direction intersecting the longitudinal direction.
Figure 4:
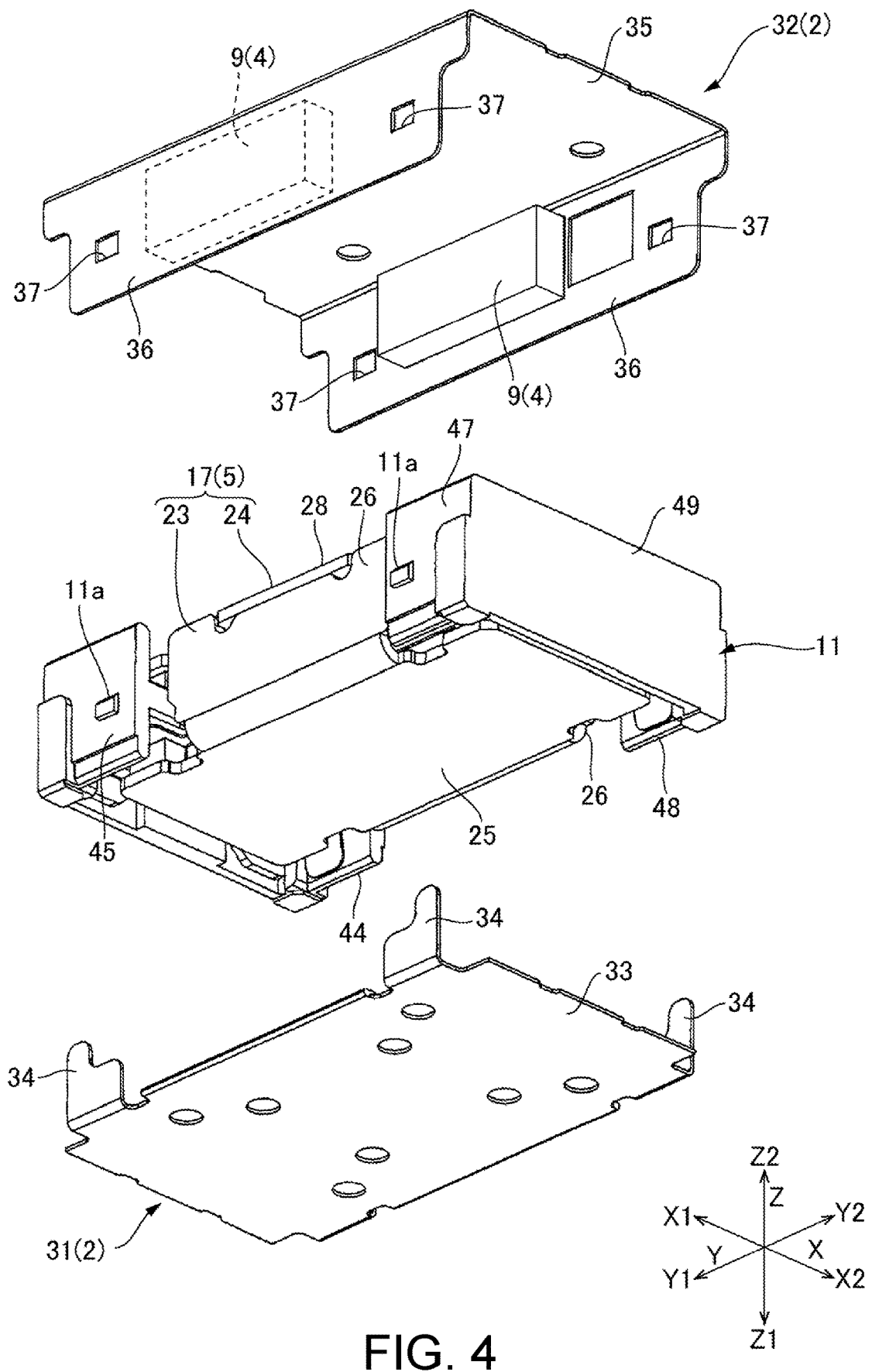
FIG. 4 is an exploded perspective view of the actuator.
Figure 5:
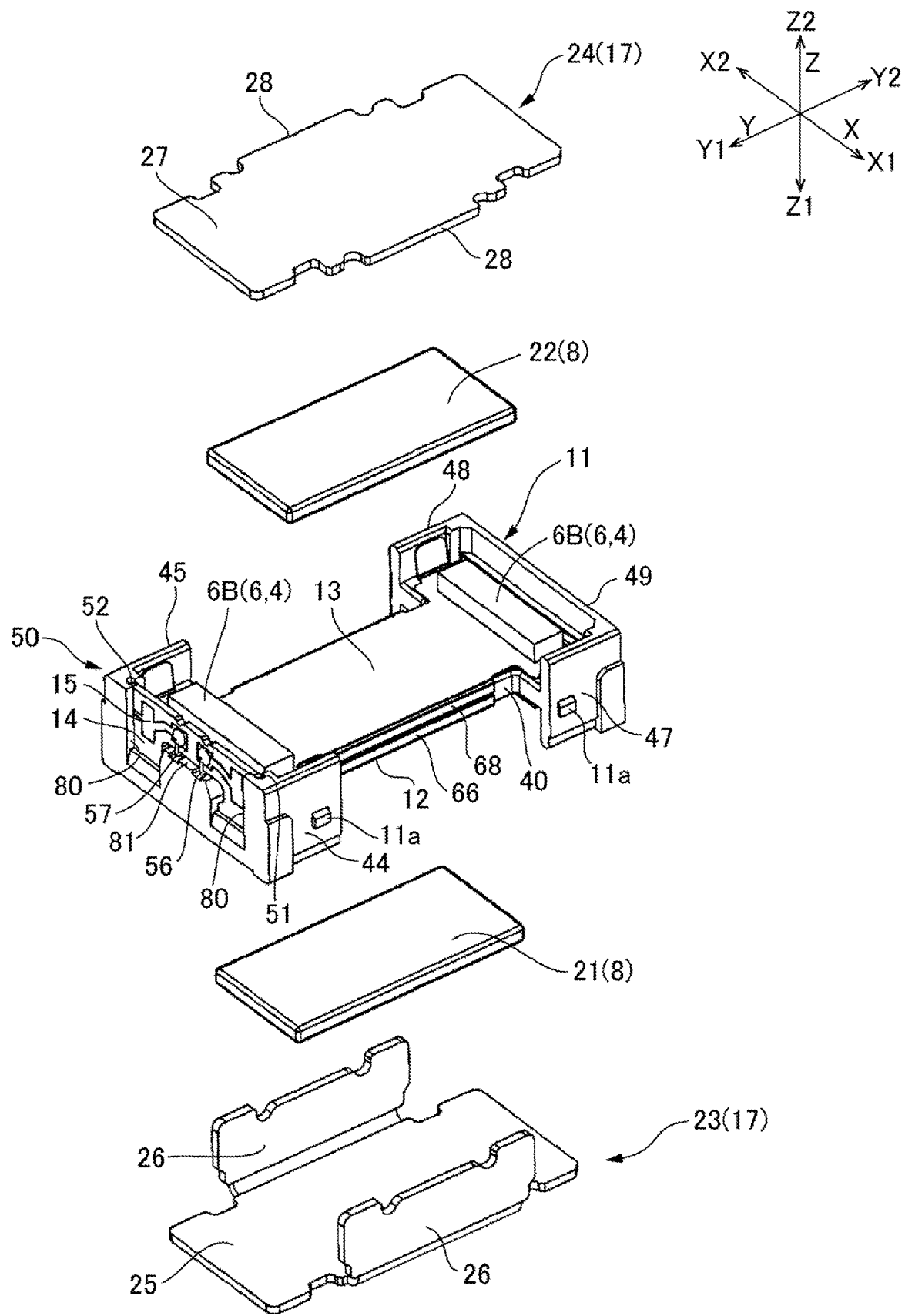
FIG. 5 is an exploded perspective view of the actuator with a case removed.
Figure 6:
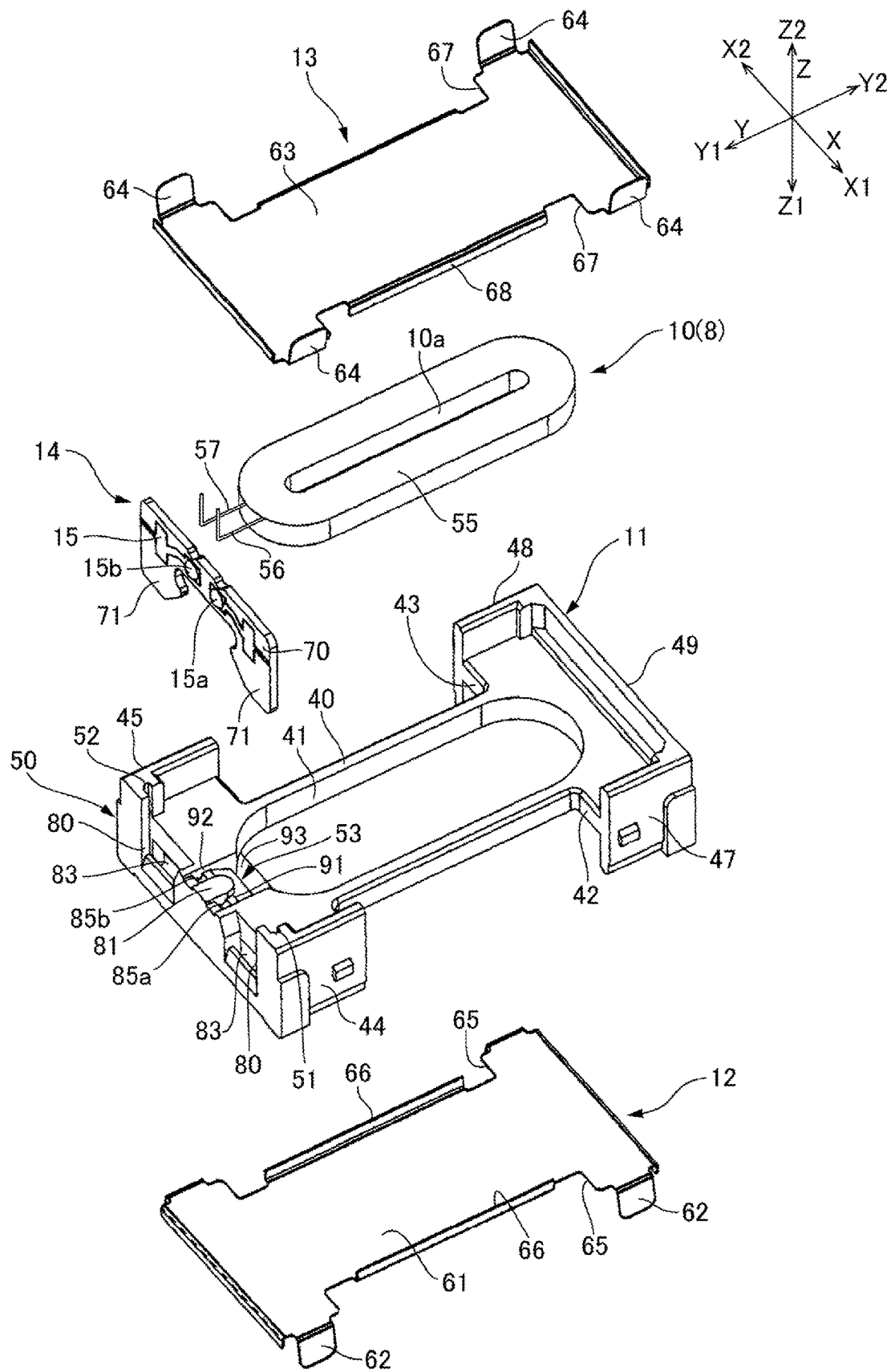
FIG. 6 is an exploded perspective view of a support body with the case removed.

FIG. 1 is a perspective view of an actuator 1 to which at least an embodiment of the present invention is applied. FIG. 2 is a cross-sectional view of the actuator 1 when cut in a longitudinal direction. FIG. 3 is a cross-sectional view of the actuator 1 cut in a direction intersecting the longitudinal direction FIG. 4 is an exploded perspective view of the actuator 1. FIG. 5 is an exploded perspective view of the actuator 1 with a case 2 removed. FIG. 6 is an exploded perspective view of a support body 3 with the case 2 removed.

The actuator 1 is used as a tactile device that transmits information by vibration. As shown in FIG. 1, the actuator 1 has a cuboid-shaped appearance. The actuator 1 generates vibration in a shorter-side direction of its appearance. In the following explanation, it is assumed that the shorter-side direction in which vibration is generated is an X direction (second direction), and a direction, which is a longitudinal direction of the actuator 1 and is perpendicular to the X direction, is a Y direction (third direction). Moreover, in the following description, a thickness direction of the actuator 1, which is orthogonal to the X and Y directions, is referred to as a Z direction (first direction). The X direction, the Y direction, and the Z direction are orthogonal to each other. Moreover, one side of the X direction is supposed to be an X1 direction and the other side to be an X2 direction. One side of the Y direction is supposed to be a Y1 direction and the other side to be a Y2 direction. One side of the Z direction is supposed to be a Z1 direction and the other side to be a Z2 direction.

As shown in FIGS. 2 and 3, the actuator 1 has a support body 3 including a case 2 that defines the outer shape, and a movable body 5 that is accommodated inside the case 2. The actuator 1 also includes a connecting body 4 that connects the support body 3 and the movable body 5, and a magnetic drive circuit 8 that relatively moves the movable body 5 in the X direction with respect to the support body 3. The connecting body 4 includes a first connecting body 6 (see FIG. 2), which is disposed at a position where the support body 3 and the movable body 5 are opposed to each other in the Z direction (first direction), and a second connecting body 9 (see FIG. 3), which is disposed at a position where the support body 3 and the movable body 5 are opposed to each other in the X direction (second direction).

The support body 3 includes a coil 10, a coil holder 11 made of resin to hold the coil 10, a first plate 12 stacked in the Z1 direction of the coil holder 11, and a second plate 13 stacked in the Z2 direction of the coil holder 11. The coil 10 has a winding portion 55 around which a coil wire is wound in an oblong shape, and a first drawn-out portion 56 as well as a second drawn-out portion 57 drawn out of an outer peripheral side of the winding portion 55 in the Y1 direction. The coil 10 has its thickness direction facing the Z direction. As shown in FIGS. 2 and 3, the winding portion 55 of the coil 10 is located at a center in the Z direction of the case 2.

Moreover, as shown in FIGS. 1, 2, and 5, the support body 3 also has a feed substrate 14 held on an end surface in the Y1 direction of the coil holder 11. The first drawn-out portion 56 and the second drawn-out portion 57 of the coil 10 are connected to a first land 15*a* and a second land 15*b* of a wiring pattern 15 provided on the surface of the feed substrate 14. Power is supplied to the coil 10 via the feed substrate 14.

The movable body 5 includes a magnet 16 and a yoke 17. The magnet 16 is opposed to the winding portion 55 of the coil 10 in the Z direction. The coil 10 and the magnet 16 constitute the magnetic drive circuit 8. As shown in FIGS. 2 and 4, the first connecting body 6 and the second connecting body 9 are cuboid-shaped members, respectively. The first connecting body 6 and the second connecting body 9 have at least one of elasticity and viscoelasticity, respectively.
Movable Body As shown in FIGS. 2, 3, and 5, the movable body 5 includes a first magnet 21 and a second magnet 22 as magnets 16. The first magnet 21 is located in the Z1 direction of the coil 10. The second magnet 22 is located in the Z2 direction of the coil 10. The first magnet 21 and the second magnet 22 are polarized into two in the X direction.

The yoke 17 is made of a magnetic material. As shown in FIGS. 3 and 4, the yoke 17 is constituted by assembling two members, that is, a first yoke 23 and a second yoke 24. As shown in FIG. 5, the first yoke 23 includes a first flat-plate portion 25 that is long in the Y direction and, on both end edges in the Y direction of the first flat-plate portion 25, a pair of connecting plate portions 26 that are curved in the Z2 direction from a center part in the Y direction toward an outside in the X direction and extending in the Z2 direction. The first magnet 21 is held on the surface in the Z2 direction of the first flat-plate portion 25. The second yoke 24 includes a second flat-plate portion 27 opposed to the first flat-plate portion 25 in the Z direction and a pair of extending portions 28 extending from an intermediate part in the Y direction of the second flat-plate portion 27 to the X1 direction and the other side X2. The second magnet 22 is held on the surface in the Z1 direction of the second flat-plate portion 27. To the pair of extending portions 28 of the second yoke 24, distal end parts in the Z2 direction of the pair of connecting plate portions 26 are joined by welding or the like. As a result, the first yoke 23 and the second yoke 24 are integrated and constitute the yoke 17.
Support Body As shown in FIGS. 1, 3, and 4, the case 2 includes a first case member 31 and a second case member 32 stacked in the Z direction. The first case member 31 is mounted on the coil holder 11 from the Z1 direction. The second case member 32 is mounted on the coil holder 11 from the Z2 direction. As shown in FIG. 4, the first case member 31 includes a rectangular-shaped first plate portion 33 and four side plate portions 34 extending in the Z1 direction from both end edges in the X direction of an end portion in the Y1 direction of the first plate portion 33 and from both end edges in the X direction of the end portion in the Y2 direction of the first plate portion 33. The four side plate portions 34 are located on both sides in the X direction of the coil holder 11.

The second case member 32 includes a rectangular-shaped second plate portion 35 and a pair of side plate portions 36 extending in the Z2 direction from both end edges in the X direction of the second plate portion 35. The pair of side plate portions 36 are located on both sides in the X direction of the coil holder 11. The pair of side plate portions 36 include lock holes 37 with which locking protruding portions 11*a* formed on the side surfaces on both sides in the X direction of the coil holder 11 are fitted.

As shown in FIG. 6, the coil holder 11 includes a plate portion 40 extending in the Y direction. A coil placement hole 41 is provided at the center of the plate portion 40. The coil placement hole 41 is an oblong through hole that is long in the Y direction. The coil placement hole 41 accommodates the winding portion 55 of the coil 10. The coil holder 11 also includes notch portions 42 and 43 that are notched inward at the center part in the Y direction at the end edges on both sides in the X direction of the plate portion 40.

Moreover, the coil holder 11 includes, in the Y1 direction of the notch portions 42 and 43, a side plate portion 44 that protrudes in the Z1 direction and the Z2 direction from the edge in the X1 direction of the plate portion 40 and a side plate portion 45 that protrudes in the Z1 direction and the Z2 direction from the edge in the X2 direction of the plate portion 40. In addition, the coil holder 11 includes a substrate support portion 50 provided on an end portion in the Y1 direction of the plate portion 40.

In addition, the coil holder 11 includes, in the Y2 direction of the notch portions 42 and 43, a side plate portion 47 that protrudes in the Z1 direction and the Z2 direction from the edge in the X1 direction of the plate portion 40, a side plate portion 48 that protrudes in the Z1 direction and the Z2 direction from the edge in the X2 direction of the plate portion 40, and a side plate portion 49 that protrudes in the Z1 direction and the Z2 direction from the end edge in the Y2 direction of the plate portion 40. The side plate portion 49 connects an end in the Y2 direction of the side plate portion 47 and an end in the Y2 direction of the side plate portion 48.

As shown in FIG. 6, the feed substrate 14 has a rectangular-shaped wiring connection portion 70 that is long in the X direction when viewed from the Y direction and a pair of leg portions 71 protruding in the Z1 direction from both end portions in the X direction in the wiring connection portion 70. The wiring pattern 15 including a first land 15*a* and a second land 15*b* is formed in the wiring connection portion 70. As shown in FIG. 5, the feed substrate 14 is supported by a substrate support portion 50 in a posture in which a surface on which the first land 15*a* and the second land 15*b* are formed is directed to the Y1 direction.

As shown in FIG. 6, the substrate support portion 50 has a pair of slits 51 and 52 opposed to each other in the X direction. The substrate support portion 50 includes a protruding portion 81 provided at the center part in the X direction of the end portion in the Y1 direction of the plate portion 40, a pair of notched recess portions 80 provided on both sides in the X direction of the protruding portion 81, and a substrate insertion hole 83 provided on an inner wall surface in the Z1 direction of each of the notched recess portions 80.

As shown in FIG. 5, the feed substrate 14 is supported by the substrate support portion 50 with the both end edges in the X direction inserted into the slits 51 and 52 from the Z2 direction. At this time, the protruding portion 81 provided between the pair of notched recess portions 80 in the plate portion 40 is press-fitted between the pair of leg portions 71 of the feed substrate 14, and the distal end portion of each of the leg portions 71 of the feed substrate 14 is inserted into the pair of substrate insertion holes 83.

Moreover, the coil holder 11 includes a guide groove 53 that extends from the coil placement hole 41 toward the substrate support portion 50 on the surface in the Z2 direction of the plate portion 40. As shown in FIG. 6, the guide groove 53 includes a common groove portion 93 that communicates with the coil placement hole 41 and groove portions 91 and 92 that extend in the Y1 direction from both ends in the X direction of the common groove portion 93. The first drawn-out portion 56 and the second drawn-out portion 57 which are pulled out in the Y1 direction from the winding portion 55 of the coil 10 are routed through the guide groove 53 and are connected to the feed substrate 14. As shown in FIG. 4, the first drawn-out portion 56 and the second drawn-out portion 57 are pulled out in an inclined direction in the common groove portion 93 and bent in the Z2 direction in recess portions 85a and 85b provided in the groove portions 91 and 92 of the guide groove 53 and then, they extend in the Z2 direction along the surface of the feed substrate 14 and are connected to the first land 15a and the second land 15b.

The first plate 12 and the second plate 13 are made of a non-magnetic material. As shown in FIG. 6, the first plate 12 has a rectangular first plane portion 61 covering the plate portion 40 from the Z1 direction and a plurality of first claw portions 62 protruding diagonally in the Z1 direction from both sides in the X direction of the first plane portion 61 toward an outside in the X direction. When the first plate 12 contacts the plate portion 40 of the coil holder 11 from the Z1 direction, the first claw portion 62 is brought into an elastic contact state with the side plate portion 44, the side plate portion 45, the side plate portion 47, and the side plate portion 48.

The second plate 13 has a rectangular second plane portion 63 covering the plate portion 40 from the Z2 direction and a plurality of second claw portions 64 protruding diagonally in the Z2 direction from both sides in the X direction of the second plane portion 63 toward the outside in the X direction. When the second plate 13 contacts the plate portion 40 of the coil holder 11 from the Z2 direction, the second claw portion 64 is brought into the elastic contact state with the side plate portion 44, the side plate portion 45, the side plate portion 47, and the side plate portion 48.

When the coil 10 is to be fixed to the coil holder 11, the first plate 12 is stacked on the plate portion 40 of the coil holder 11 from the Z1 direction. As a result, the first plate 12 is supported by the coil holder 11 with the coil placement hole 41 blocked from the Z1 direction. Next, the winding portion 55 of the coil 10 is disposed in the coil placement hole 41, and an adhesive is filled in a center hole 10a of the winding portion 55. Then, the second plate 13 is stacked on the plate portion 40 of the coil holder 11 from the Z2 direction so as to be supported on the coil holder 11. The first plate 12 and the second plate 13 are fixed to the plate portion 40 of the coil holder 11 by an adhesive layer 59, which is a cured adhesive. Moreover, the adhesive flows into a space between the inner wall surface of the coil placement hole 41 and the winding portion 55 and is cured. As a result, the winding portion 55 is fixed to the inner wall surface of the coil placement hole 41.

As shown in FIG. 6, the first plate 12 includes a pair of notch portions 65 notched inward at the center part in the Y direction on end edges on the both sides in the X direction of the first plane portion 61, and the first claw portions 62 are provided on both sides in the Y direction of each of the notch portions 65, respectively. Moreover, the first plate 12 includes a pair of bent plate portions 66 bent to the Z2 direction from the inner edges in the X direction of the pair of notch portions 65. As shown in FIG. 3, the pair of bent plate portions 66 cover end surfaces on the both sides in the X direction of the plate portion 40 of the coil holder 11.

Similarly, the second plate 13 includes a pair of notch portions 67 notched inward at the center part in the Y direction on end edges on the both sides in the X direction of the second plane portion 63, and the second claw portions 64 are provided on both sides in the Y direction of each of the notch portions 67, respectively. Moreover, the second plate 13 includes a pair of bent plate portions 68 bent to the Z2 direction from the inner peripheral edges in the X direction of the pair of notch portions 67. As shown in FIG. 3, the pair of bent plate portions 68 cover end surfaces on the both sides in the X direction of the plate portion 40 of the coil holder 11.

Connecting Body

As shown in FIG. 2, the first connecting body 6 includes a one-side connecting body 6A disposed between the first yoke 23 and the first plate 12, and an other-side connecting body 6B disposed between the second yoke 24 and the second plate 13. As shown in FIG. 2, the one-side connecting body 6A and the other-side connecting body 6B are disposed symmetrically to the Z direction with respect to the center in the Z direction of the plate portion 40 as a reference.

In more detail, the one-side connecting body 6A is composed of two members of the same shape, and is sandwiched at two spots, that is, between the end portion in the Y1 direction of the first yoke 23 and the end portion in the Y1 direction of the first plate 12 and between the end portion in the Y2 direction of the first yoke 23 and the end portion in the Y2 direction of the first plate 12. The two pieces of the one-side connecting bodies 6A are disposed on both sides in the Y direction of the first magnet 21. In this embodiment, the one-side connecting body 6A has a cuboid shape extending long in the X direction and has the same shape as that of the other-side connecting body 6B shown in FIG. 5.

The other-side connecting body 6B is disposed between the second yoke 24 and the second plate 13. In more detail, the other-side connecting body 6B is composed of two members of the same shape, and is sandwiched at two spots, that is, between the end portion in the Y1 direction of the second yoke 24 and the end portion in the Y1 direction of the second plate 13 and between the end portion in the Y2 direction of the second yoke 24 and the end portion in the Y2 direction of the second plate 13. The two pieces of the other-side connecting bodies 6B are disposed on both sides in the Y direction of the second magnet 22. The one-side connecting body 6A and the other-side connecting body 6B are compressed in the Z direction between the support body 3 and the movable body 5.

As shown in FIGS. 3 and 4, the second connecting body 9 is disposed at a position where a pair of connecting plate portions 26 that constitute side surfaces in the X direction of the yoke 17 and a pair of side plate portions 36 that are disposed on both sides in the X direction of the yoke 17 are opposed to each other in the X direction. In more detail, the second connecting body 9 is composed of two members of the same shape and is sandwiched between one of the pair of connecting plate portions 26 and one of the pair of side plate portions and between the other of the pair of connecting plate portions 26 and the other of the pair of side plate portions. The second connecting body 9 is compressed in the X direction between the connecting plate portion 26 and the side plate portion 36.

The first connecting body 6 and the second connecting body 9 are gel-like members made of silicone gel. Silicone gel is a viscoelastic body whose spring constant when deformed in an expanding/contracting direction is approximately three times larger than the spring constant when deformed in a shear direction. When the viscoelastic body is deformed in a direction (shear direction) that intersects a thickness direction, the deformation is in a direction that it is pulled and stretched and thus, it has such deformation characteristics that a linear component is larger than a nonlinear component. When it is pressed and compressed/deformed in the thickness direction, it has such expanding/contracting characteristics that the nonlinear component is larger than the linear component, while the linear component is larger than the nonlinear component, when it is pulled and stretched in the thickness direction.

Alternatively, various rubber materials such as natural rubber, diene rubber (styrene butadiene rubber, isoprene rubber, butadiene rubber, chloroprene rubber, acrylonitrile butadiene rubber and the like, for example), non-diene rubber (butyl rubber, ethylene-propylene rubber, ethylene-propylene-diene rubber, urethane rubber, silicone rubber, fluororubber and the like, for example), thermoplastic elastomers, and their modified materials may be used as the first connecting body 6 and the second connecting body 9.

The first connecting body 6 and the second connecting body 9 are both silicone gel, but they have different spring constants when they are compressed/deformed. In more detail, the spring constant when the second connecting body 9 is compressed/deformed is larger than the spring constant when the first connecting body 6 is compressed/deformed. For example, since hardness of the silicone gel can be adjusted by changing a mixing ratio of raw materials to be mixed when manufacturing the silicone gel, the spring constant at shear deformation and the spring constant at compression deformation can be adjusted. Therefore, as the second connecting body 9, the one with a spring constant which is larger than that of the first connecting body 6 when compressed/deformed can be used.

Operation of Actuator

In a state where the movable body 5 is supported by the support body 3 through the connecting body 4 (the first connecting body 6 and the second connecting body 9), the winding portion 55 of the coil 10 held by the plate portion 40 of the coil holder 11 is opposed to the first magnet 21 through the first plate 12 in the Z1 direction and is opposed to the second magnet 22 through the second plate 13 in the Z2 direction as shown in FIG. 3. As a result, the magnetic drive circuit 8 is constituted.

When a current in a predetermined direction is supplied to the coil 10 via the feed substrate 14, the movable body 5 supported by the support body 3 moves relative to the support body 3 in one of the X direction by the driving force of the magnetic drive circuit 8. Then, when the direction of the electric current is reversed, the movable body 5 moves relative to the support body 3 in the other of the X direction. The repeated reversal of the direction of the current supplied to the coil 10 vibrates the movable body 5.

When the movable body 5 vibrates in the X direction, in the actuator 1, the first connecting body 6 is deformed in the shear direction and the second connecting body is deformed in the expanding/contracting direction. Therefore, the spring constant of the connecting body 4 as a whole is a composite value of the spring constant in the shear direction of the first connecting body 6 and the spring constant in the expanding/contracting direction of the second connecting body 9.

A drive voltage and a drive waveform of the magnetic drive circuit 8 is controlled by a control device, not shown. In this embodiment, the drive waveform when driving the magnetic drive circuit 8 is a periodically varying pulse waveform, and each pulse is a square wave. Therefore, in whichever direction of the X1 direction and the X2 direction the movable body 5 moves, a drive current instantaneously rises to a peak value, a large drive force is instantaneously applied to the movable body 5 and thus, the movable body 5 vibrates while moving with large acceleration. Therefore, the user can experience the sense of force.

In the yoke 17, an end portion on a Y1 side of the first flat plate portion 25 and an end portion on the Y1 side of the second flat plate portion 27 are disposed between the side plate portion 44 and the side plate portion 45 of the coil holder 11. Also, an end portion on a Y2 side of the first flat plate portion 25 and an end portion on the Y2 side of the second flat plate portion 27 are disposed between the side plate portion 47 and the side plate portion 48 of the coil holder 11. Therefore, the side plate portions 44, 45, 47, and 48 function as degree striking portions that define the movable range when the movable body 5 moves in the X direction.

Main Effects of the Embodiment

As described above, the actuator 1 of this embodiment includes the support body 3 and the movable body 5, the connecting body 4 connected to the movable body 5 and the support body 3, and the magnetic drive circuit 8 including the coil 10 and magnet 16 opposed to the coil 10 in the Z direction (first direction) and causing the movable body 5 to vibrate in the X direction (second direction) with respect to the support body 3. The connecting body 4 includes the first connecting body 6 disposed at the position where the movable body 5 and the support body 3 are opposed to each other in the Z direction (first direction), and the second connecting body 9 disposed at the position where the movable body 5 and the support body 3 are opposed to each other in the X direction (second direction).

According to this embodiment, the first connecting body 6 is disposed at the position where the movable body 5 and the support body 3 are opposed to each other in the Z direction (first direction), which intersects the vibration direction of the movable body 5, and the second connecting body 9 is disposed at the position where the movable body 5 and the support body 3 are opposed to each other in the X direction (second direction), which is the vibration direction of the movable body 5. In the configuration as above, when the movable body 5 vibrates, the first connecting body 6 is sheared/deformed while the second connecting body 9 is expanded/contracted, and the movable range of the movable body 5 is regulated by the second connecting body 9. Therefore, since the vibration characteristics of the movable body 5 can be regulated by using not only the deformation characteristics in the shear direction of the first connecting body 6 but also the deformation characteristics in the expanding/contracting direction of the second connecting body 9, the drive force applied to the movable body 5 can be increased even when the movable range of the movable body 5 is narrow, and the movable body 5 can be vibrated while being moved with large acceleration. Therefore, even with the small-sized actuator 1, the user can experience the sense of force caused by movement of the movable body 5 with large acceleration.

In this embodiment, the first connecting body 6 and the second connecting body 9 are viscoelastic bodies. In this way, the first connecting body 6 is deformed with the deformation characteristic that has many linear components when it is sheared/deformed, while the second connecting body 9 is deformed with the deformation characteristic that has many nonlinear components when it is compressed/deformed and thus, the spring constant increases as the compression amount increases. By using the deformation characteristics of the viscoelastic body as above, the drive force applied to the movable body 5 can be increased even when the movable range of the movable body 5 is narrow, and the movable body 5 can be vibrated while being moved with large acceleration.

In this embodiment, the spring constant when the first connecting body 6 is deformed in the compression direction is different from the spring constant when the second connecting body 9 is deformed in the compression direction, and the spring constant when the second connecting body 9 is deformed in the compression direction is larger than the spring constant when the first connecting body 6 is deformed in the compression direction. As described above, by increasing the spring constant of the connecting body 4 that is disposed at a position where it is compressed/deformed by the movable body 5, a compression/deformation amount can be suppressed even when the movable body 5 is moved with larger acceleration. Therefore, the movable body 5 can be moved with larger acceleration, and the user can experience a greater sense of force.

In this embodiment, the drive waveform when driving the magnetic drive circuit 8 is a square wave. Therefore, since a large drive force can be applied to the movable body 5 instantaneously, the acceleration of the movable body 5 can be increased rapidly. Therefore, even when the movable range of the movable body 5 is narrow, the movable body 5 can be moved with large acceleration. Therefore, the user can experience a great sense of force.

In this embodiment, the support body 3 includes the case 2 that accommodates the movable body 5 and the magnetic drive circuit 8, and the coil holder 11 that holds the coil 10, and the coil holder 11 includes the plate portion 40 in which the coil placement hole 41 is provided. The movable body 5 includes the yoke 17 that holds the magnet 16, and the yoke 17 includes the first flat plate portion 25 opposed to the plate portion 40 from the Z1 direction (one side of the first direction), the second flat plate portion 27 opposed to the plate portion 40 from the Z2 direction (the other side of the first direction), and the pair of connecting plate portions 26 disposed on the both sides in the X direction (second direction) of the plate portion 40. The case 2 includes the pair of side plate portions 36 that are disposed on both sides in the X direction (second direction) of the yoke 17. The second connecting body 9 is disposed between one of the pair of connecting plate portions 26 and one of the pair of side plate portions 36, and between the other of the pair of connecting plate portions 26 and the other of the pair of side plate portions 36. Therefore, since the second connecting body 9 is sandwiched between the case 2 and the yoke 17 on both sides in the X direction of the movable body 5, in whichever of one side and the other side of the X direction (second direction) the movable body 5 moves, the second connecting body 9 is compressed/deformed. Therefore, the movable body 5 can be driven with large acceleration by using the increase of the spring constant when the second connecting body 9 is compressed/deformed.

In this embodiment, the support body 3 includes the first plate 12 that covers the plate portion 40 and the coil 10 from the Z1 direction (one side of the first direction), and a second plate 13 that covers the plate portion 40 and the coil 10 from the Z2 direction (the other side of the first direction). The magnet 16 includes the first magnet 21 that is fixed to the first flat plate portion 25 and is opposed to the coil 10 from the Z1 direction (one side of the first direction) through the first plate 12, and the second magnet 22 that is fixed to the second flat plate portion 27 and is opposed to the coil 10 from the Z2 direction (the other side of the first direction) through the second plate 13. The first connecting body 6 includes the one-side connecting body 6A that connects the first flat plate portion 25 and the first plate 12, and the other-side connecting body 6B that connects the second flat plate portion 27 and the second plate 13. Therefore, since the gap in the Z direction (first direction) between the yoke 17 and the coil holder 11 is used as the placement space for the first connecting body 6, there is no need to secure the placement space for the first connecting body 6 between the case 2 and the yoke 17. Therefore, the height of the actuator 1 in the Z direction (first direction) can be reduced to make it more compact.

Variation (1) In the above embodiment, the first connecting body 6 is disposed at the position where the movable body 5 and the support body 3 are opposed to each other in the Z direction (first direction), but the position of the first connecting body 6 may be at a position where the movable body 5 and the support body 3 are opposed to each other in the Y direction (third direction). For example, such configuration may be employed that a penetrating portion that penetrates the plate portion 40 in the Z direction is provided on both sides in the Y direction of the coil placement hole 41, and a connecting plate portion that connects end portions on both sides in the Y direction of the first flat plate portion 25 and the second flat plate portion 27 of the yoke 17 is disposed in this penetrating portion, and the first connecting body 6 made of a viscoelastic body is sandwiched at a position where the connecting plate portion and the plate portion 40 are opposed in the Y direction. In the configuration as above, too, when the movable body 5 vibrates in the X direction, the first connecting body 6 is deformed in the shear direction, and the second connecting body 9 is deformed in the expanding/contracting direction. Therefore, the same effect as that of the above embodiment can be obtained.

(2) In the above embodiment, the entire connecting body 4 is a viscoelastic body, but a part of the connecting body 4 may be an elastic body. For example, it may be so configured that the first connecting body 6 is an elastic body, and the second connecting body 9 is a viscoelastic body. Moreover, either one or both of the first connecting body 6 and the second connecting body 9 may be a composite member including an elastic body and a viscoelastic body. For example, it can be a composite member consisting of a metal spring covered with silicone gel.

(3) In the above embodiment, the first connecting body 6 and the second connecting body 9 are viscoelastic bodies with different materials and different spring constants, but they may be viscoelastic bodies with the same spring constant.

What is claimed is:

1. An actuator, comprising:
   a support body;
   a movable body;

a connecting body that is connected to the movable body and the support body; and a magnetic drive circuit including a coil and a magnet opposed to the coil in a first direction and to cause the movable body to vibrate in a second direction that intersects the first direction with respect to the support body, wherein the connecting body includes:

a first connecting body disposed at a position where the movable body and the support body are opposed in the first direction or a position where the movable body and the support body are opposed in a third direction that intersects the first direction and intersects the second direction; and a second connecting body disposed at a position where the movable body and the support body are opposed in the second direction, wherein the support body includes a case to accommodate the movable body and the magnetic drive circuit, and a coil holder to hold the coil, the coil holder including a plate portion in which a coil placement hole is provided;

the movable body includes a yoke to hold the magnet;

the yoke includes a first flat plate portion opposed to the plate portion from one side of the first direction, a second flat plate portion opposed to the plate portion from the other side of the first direction, and a pair of connecting plate portions disposed on both sides in the second direction of the plate portion;

the case includes a pair of side plate portions disposed on both sides in the second direction of the yoke; and the second connecting body is disposed between one of the pair of connecting plate portions and one of the pair of side plate portions, and between the other of the pair of connecting plate portions and the other of the side plate portions.

2. The actuator according to claim 1, wherein
a drive waveform when the magnetic drive circuit is driven has a square wave.

3. The actuator according to claim 1, wherein
the support body includes a first plate that covers the plate portion and the coil from one side of the first direction, and a second plate that covers the plate portion and the coil from the other side of the first direction;

the magnet includes a first magnet that is fixed to the first flat plate portion and is opposed to the coil from one side of the first direction through the first plate, and a second magnet that is fixed to the second flat plate portion and is opposed to the coil from the other side of the first direction through the second plate; and the first connecting body includes a one-side connecting body to connect the first flat plate portion and the first plate, and an other-side connecting body to connect the second flat plate portion and the second plate.

4. The actuator according to claim 1, wherein
the first connecting body and the second connecting body are viscoelastic bodies.

5. The actuator according to claim 4, wherein
a spring constant when the first connecting body is deformed in a compression direction is different from a spring constant when the second connecting body is deformed in a compression direction.

6. The actuator according to claim 5, wherein
the spring constant when the second connecting body is deformed in the compression direction is larger than the spring constant when the first connecting body is deformed in the compression direction.

* * * * *